United States Patent
Beene et al.

(10) Patent No.: US 6,481,604 B1
(45) Date of Patent: Nov. 19, 2002

(54) VEHICLE RACK

(75) Inventors: Jeffrey Beene, Fairfax, VA (US); Kathryn Cohen, Canton, MA (US); Linda Bliss, Corning, NY (US); Lauren Icken, Northport, NY (US); Samuel Ferraro-Pollak, Albany, NY (US); Sreekumar Vijaykumar, Pittsburgh, PA (US)

(73) Assignee: Ford Global Technologies, Inc., Dearborn, MI (US)

( * ) Notice: Subject to any disclaimer, the term of this patent is extended or adjusted under 35 U.S.C. 154(b) by 49 days.

(21) Appl. No.: 09/804,831

(22) Filed: Mar. 13, 2001

(51) Int. Cl.[7] ................................................. B60R 9/00
(52) U.S. Cl. ........................ 224/404; 224/403; 224/543; 224/547; 224/556; 296/37.6
(58) Field of Search ................................. 224/403, 404, 224/405, 543, 547, 556; 296/37.6; 248/55.3; 410/139

(56) References Cited

U.S. PATENT DOCUMENTS

| | | | |
|---|---|---|---|
| 3,945,501 A | | 3/1976 | Jay |
| 4,396,324 A | | 8/1983 | Ellis |
| 4,444,427 A | * | 4/1984 | Martin ........................ 224/403 |
| 4,772,165 A | * | 9/1988 | Bartkus .......................... 211/7 |
| 4,875,730 A | | 10/1989 | Justice |
| 5,439,150 A | | 8/1995 | Trahms |
| 5,494,327 A | * | 2/1996 | Derecktor ................... 224/321 |
| 5,584,521 A | | 12/1996 | Hathaway |
| 5,588,631 A | * | 12/1996 | Yee ................................. 211/4 |
| 5,597,193 A | * | 1/1997 | Conner ........................ 224/404 |
| 5,685,593 A | | 11/1997 | O'Connor |
| 5,779,117 A | * | 7/1998 | Rogers et al. .............. 224/403 |
| 5,820,004 A | | 10/1998 | Lane |
| 5,842,615 A | | 12/1998 | Goodness |
| 5,855,310 A | * | 1/1999 | Van Ert et al. ............. 224/275 |
| 5,868,295 A | | 2/1999 | Carriere |
| 5,893,597 A | | 4/1999 | Rider |
| 5,897,154 A | | 4/1999 | Albertini et al. |
| 5,924,615 A | | 7/1999 | McGarrah |
| 5,924,616 A | | 7/1999 | Shives |
| 5,931,632 A | | 8/1999 | Dongilli et al. |
| 5,964,492 A | | 10/1999 | Lyon |
| 6,003,923 A | | 12/1999 | Scott et al. |
| 6,007,129 A | * | 12/1999 | Kearney, Jr. ................ 224/404 |
| 6,044,990 A | | 4/2000 | Palmeri |

* cited by examiner

Primary Examiner—Stephen K. Cronin
(74) Attorney, Agent, or Firm—Gigette Bejin

(57) ABSTRACT

A vehicle rack which supports different accessory having mounting pegs on a pickup truck bed is provided. The vehicle rack includes a plurality of retaining arms wherein each of the plurality of retaining arms are received within a stake pocket of the pickup truck bed. The invention further includes a panel and a locking member where the panel is integral with the plurality of retaining arms and may extend along a side wall of the pickup truck. The panel defines a plurality of apertures for receiving the mounting pegs of the at least one accessory. The locking member is moveably affixed to the panel, and has a plurality of obstructions which partial close the openings of the plurality of apertures when the locking member is slid into a locked position.

7 Claims, 4 Drawing Sheets

VEHICLE RACK

FIELD OF THE INVENTION

The present invention generally relates to a multi-purpose rack for a bed of a pickup truck.

BACKGROUND OF THE INVENTION

Pickup trucks have limited passenger compartment space and no trunk space. Accordingly, it is necessary to place items to be transported in the bed of the pickup truck where the items are exposed to wind, dust, rain and snow. Furthermore, the bed of a pickup truck is a wide open unsecured area where the items to be transported are apt to roll about the bed of the pickup truck.

A prior art device which addresses the storage and transport issues of pickup trucks is disclosed in U.S. Pat. No. 5,584,521 issued to Hathaway et. al. The '521 patent describes a vehicle modular rail system which includes first and second rail assemblies which overlay the top surfaces of the first and second truck bed side walls. Each rail includes a channel for receiving a mating portion of an accessory or an attachment for an accessory. The modular rail system of the prior art must be permanently affixed to the vehicle via bolts or other fasteners. Furthermore, the modular rail system does not include a means for locking the components to the rails.

Consequently, a need has developed for a vehicle rack which may be easily mounted and removed from the bed of a pickup truck yet securely fastens a variety of components to the bed of a pickup truck.

SUMMARY OF THE INVENTION

Accordingly, it is a principle object of the present invention to provide a vehicle rack which may be easily mounted and removed from the bed of a pickup truck yet may used to create a variety of different storage compartments in a pickup truck bed and to secure different components to the vehicle.

It is another object of the present invention to provide a vehicle rack which may be implemented without requiring any modifications to the bed of a pickup truck.

It is still another object of the present invention to provide a vehicle rack which is compact in size.

It is yet another object of the present invention to provide a lightweight vehicle rack.

It is still another object of the present invention to provide a vehicle rack which supports different accessory having mounting pegs on a pickup truck bed. The vehicle rack includes a plurality of retaining arms, a panel, and a locking member. The panel is integral with each of the plurality of retaining arms, and the panel may extend along a side wall of the pickup truck. The panel operates as the surface upon which accessories are mounted. The panel defines a plurality of apertures for receiving the mounting pegs of the at least one accessory.

When installed in a vehicle, each of the retaining arms of the vehicle rack is received within a corresponding stake pocket of the pickup truck bed. The rack may be further supported by the wheel housing at the bottom end of the rack.

The locking member of the vehicle rack is moveably affixed to the panel and slides within a recess defined by the panel. The locking member further includes a plurality of obstructions which partially close the openings of the plurality of apertures in the panel when the locking member is slid into a locked position thereby securing the mounting pegs.

As those skilled in the art will recognize, the embodiments of this invention may vary depending upon the specific requirements of a vehicle. Accordingly, the particular size and shape of the panel, locking member, retaining arms and accessories may vary, depending on the particular application.

The above objects and other objects, features, and advantages of the present invention are more readily understood from a review of the attached drawings and accompanying specification and claims.

DETAILED DESCRIPTION OF THE PREFERRED EMBODIMENT

A multi-purpose vehicle rack 10 which supports different accessories on a pickup truck bed 12 is provided. The different accessories may include compartment dividers, brackets, benches, or other components such as tool boxes. The multi-purpose vehicle rack 10 may be easily mounted to the bed 12 of a pickup truck 34 without requiring any modifications to the bed 12 of the pickup truck 34. Furthermore, the vehicle rack 10 of the present invention is lightweight and takes up very little space in the bed of a pickup truck.

Figure 1:
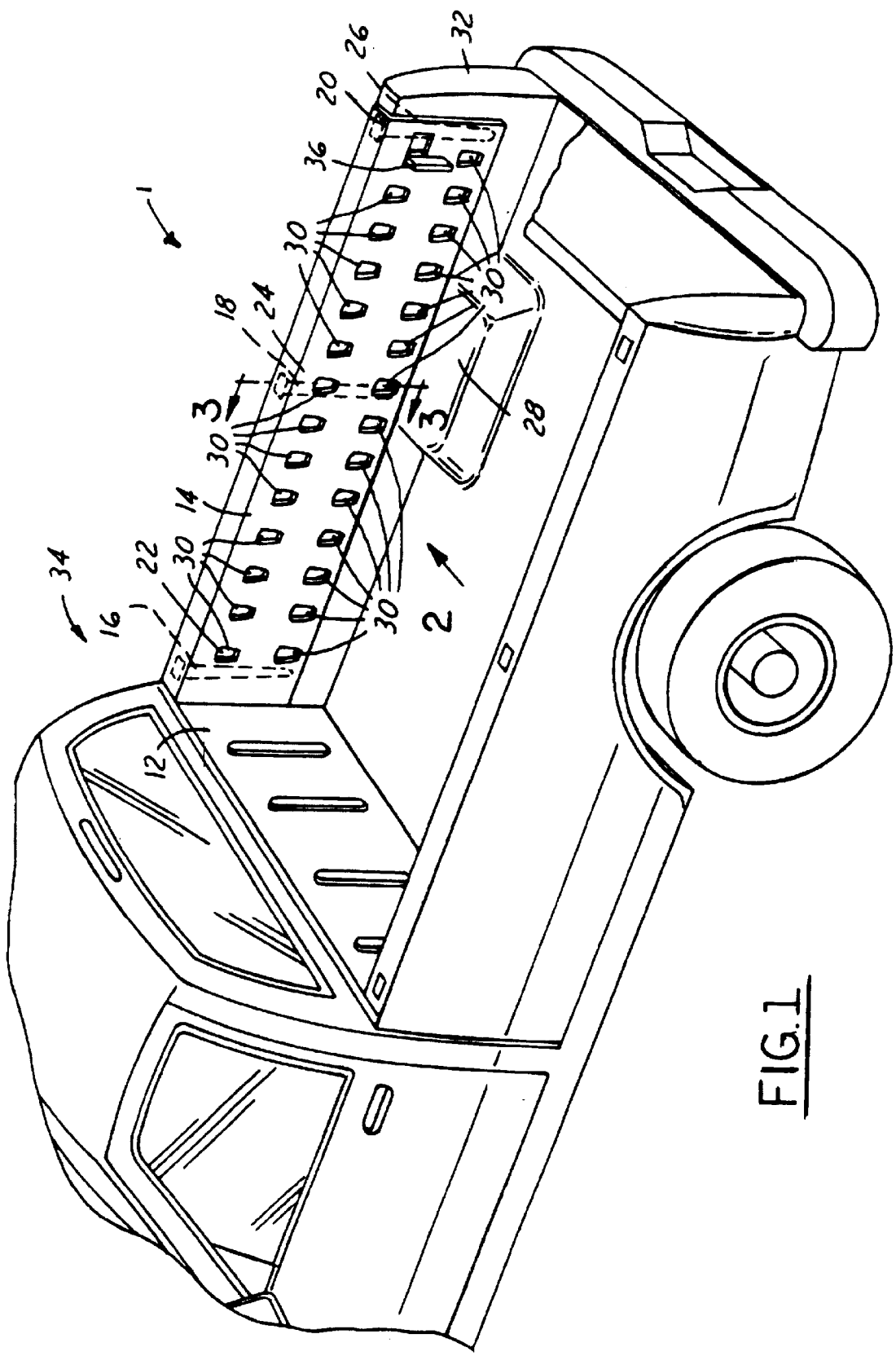
FIG. 1 is a perspective view of the multi-purpose rack installed in the bed of a pickup truck in an unlocked position.
Figure 6A:
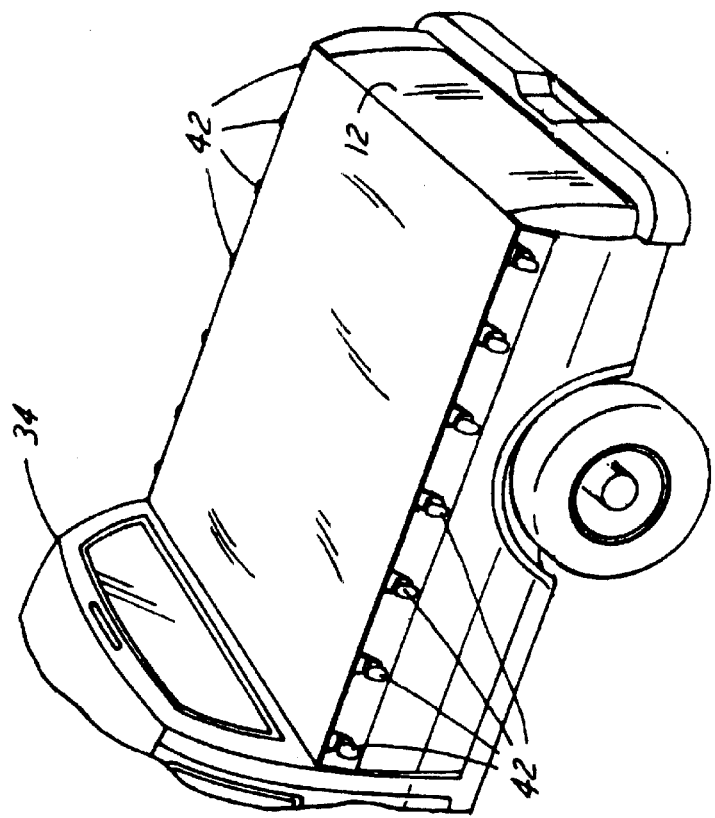
FIGS. 6a, 6b and 6c are perspective views of different accessories mounted on the vehicle rack.
Figure 6B:
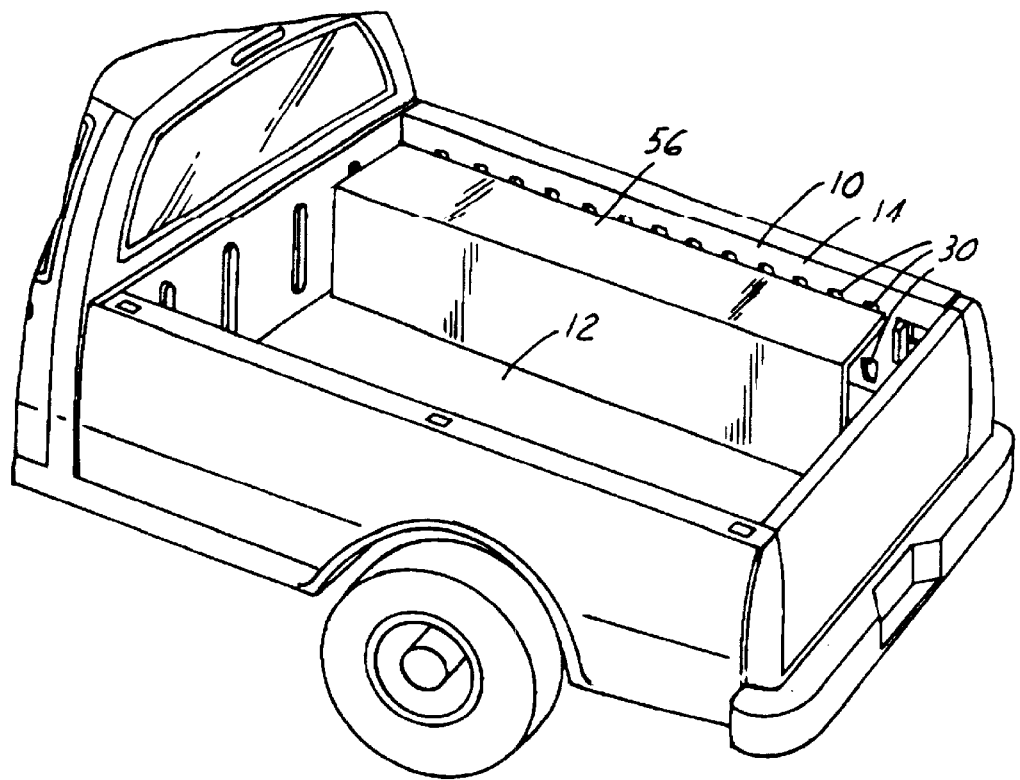
Figure 6C:
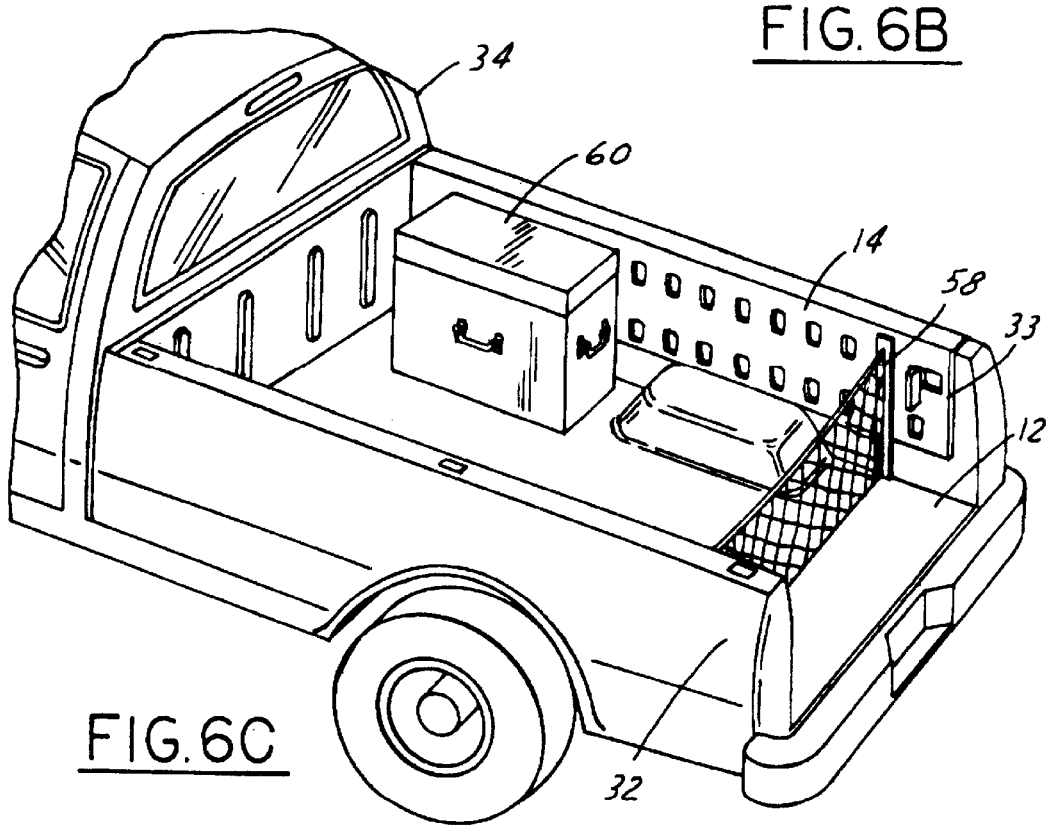

With reference to FIG. 1, a perspective view of the present invention 10 is shown where the invention is installed in the bed 12 of a pickup truck in an unlocked position. The bed 12 of the pickup truck includes a front wall, a rear wall formed by a tailgate and opposing first and second side walls 32, 33. In FIG. 1, the multi-purpose vehicle rack 10 is mounted on a first side wall 32. The rack includes a panel 14 and retaining arms 16, 18, 20. The panel 14 of the present invention supports different accessories having mounting pegs 42 as shown in FIGS. 6a, 6b, and 6c. FIG. 6a illustrates a tonneau cover 54 with mounting pegs 42 installed on a truck 34. FIG. 6b illustrates a bench 56 with mounting pegs 42 installed on a truck 34 and FIG. 6c illustrates a netted divider 58 and cooler 60 installed on a truck. The panel 14 of the vehicle rack 10 may also support tool boxes, ski racks, golf club bins, and hooks in addition to several other components.

Figure 3:
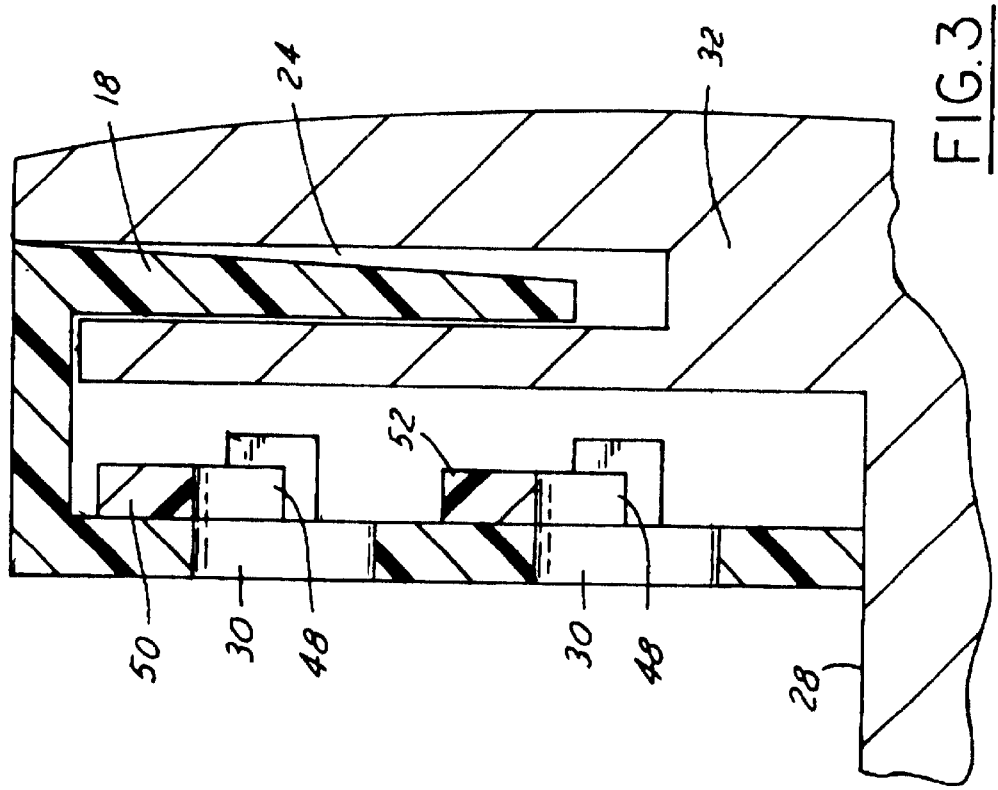
FIG. 3 is a cross-sectional view of the present invention taken along lines 3—3 of FIG. 1.

Referring back to FIG. 1, the vehicle rack 10 does not require a user to modify the bed 12 of the pickup truck 34 to install the rack 10. Rather, the rack 10 is mounted onto the pickup truck bed 12 through the plurality of retaining arms 16, 18, 20. The plurality of retaining arms 16, 18, 20 are received within the stake pockets 22, 24, 26 of the pickup truck bed 12. As shown in FIG. 3, the retaining arms 16, 18, 20 of the present invention 10 are integral with the panel 14.

The vehicle rack may be installed on a vehicle where it extends along the entire side wall 32 of the pickup truck 34 as shown in FIG. 1. In the alternative, a shortened panel 14 may extend only along particular sections of the truck 34 to accommodate other truck accessories or devices. Moreover, as shown in FIG. 6c, the rack 10 may be installed on both the first and second sides 32, 33 of the bed 12 of the pickup truck 34. This arrangement is necessary where an accessory such as a dividing member 58 must be mounted on both sides of the bed as shown in FIG. 6c.

The panel 14 of the present invention 10 defines a plurality of apertures 30 which are operative to receive pegs affixed to the accessories shown in FIGS. 6a, 6b and 6c. The panel 14 in addition to the retaining arms 16, 18, 20 are preferably, but not necessarily made of Aluminum.

Figure 2A:
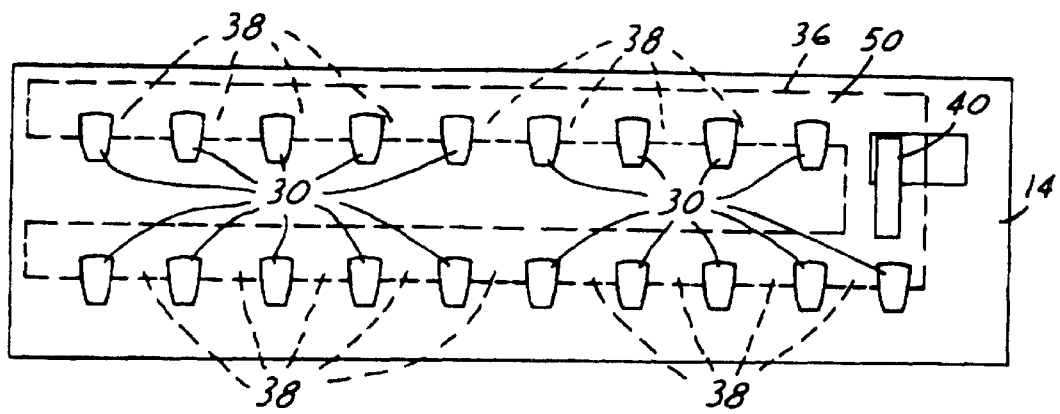
FIG. 2a is a front view of the multi-purpose rack in a locked position.

Referring now to FIG. 2a, the present invention further includes a locking member 36 which is slidably engaged with the panel 14. The locking member 36 may include an upper elongate arm 50 and a lower elongate arm 52. Each of the elongate arms 50, 52 may have a plurality of obstructions 38 which partially close the apertures 30 and prevent the mounting pegs (shown in FIGS. 4 and 5) of the accessories from slipping out of the apertures 30 when the locking member 36 is slid into a locked position as shown in FIG. 2a.

Figure 2B:
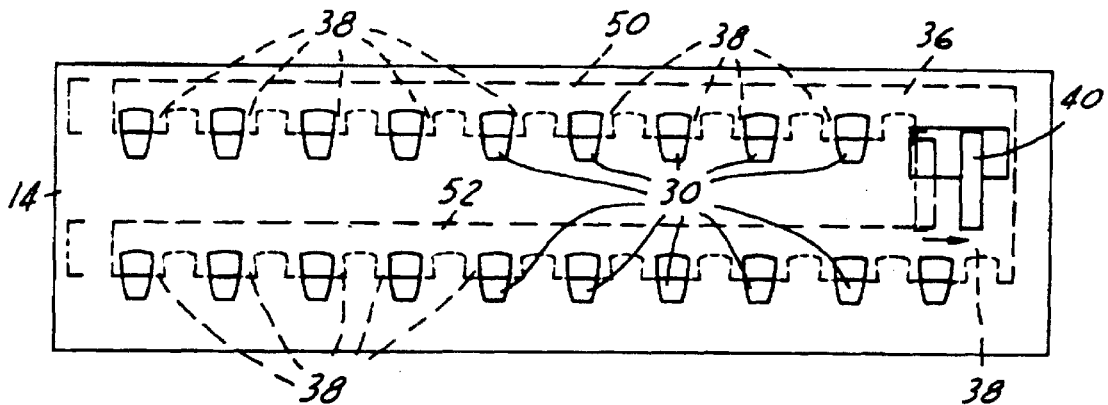
FIG. 2b is a front view of the multi-purpose rack in an unlocked position.

Referring now to FIG. 2b, the vehicle rack 10 is shown in an unlocked position. In this embodiment, the handle 40 of the locking member 36 is pushed so that the obstructions 38 are moved to the left of the apertures 30 thereby allowing mounting pegs to be freely inserted or removed from the aperture 30.

Figure 4:
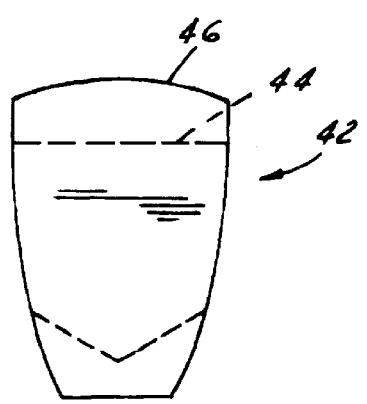
FIG. 4 is a front view of one embodiment of a mounting peg for the accessories used in conjunction with the vehicle rack.
Figure 5:
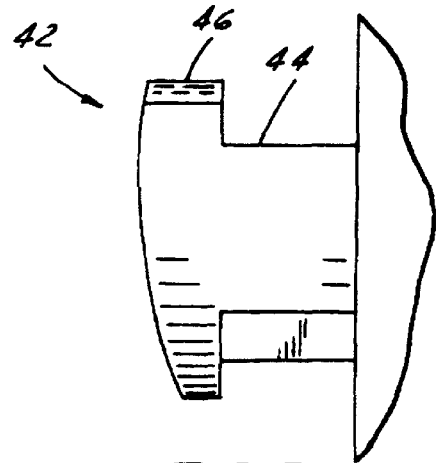
FIG. 5 is a side view of the mounting peg for the accessories mountable to the vehicle rack.

FIGS. 4 and 5 illustrate the front view and side view of a mounting peg 42 which may mounted on an accessory for engagement with the vehicle rack 10. The mounting peg 42 shown in FIGS. 4 and 5 may be integral to or affixed to different accessories such as a netting divider, a bench, tonneau cover, or the like. The mounting peg 42 includes a neck portion 44 and a head portion 46. Upon mounting the accessory, the neck portion 44 and the head 46 are inserted into the aperture 30. The neck portion extends through the panel and beyond the locking member 36. The head 46 of the mounting peg 42 must be seated behind the locking member 36 when the panel 14 is in a locked position.

Referring now to FIG. 3, a cross sectional view of the panel, retaining member and locking member is shown along lines 3—3 of FIG. 1. As shown the back section of the panel 14 defines a recess 48 for receiving the upper arm 50 and the lower arm 52 of the locking member 36. The locking member 36 may slide within the recess 48 to partially close the plurality of apertures 30 in the panel. By partially closing the plurality of apertures 30, the locking member 36 prevents the mounting pegs 42 from falling through the apertures 30 thereby securing the accessory in the bed 12 of the pickup truck 34. Also, as shown in FIG. 3, the vehicle rack 10 does not require a user to make any modifications the bed of the pickup truck. The retaining arm 18 is inserted within the stake pocket 22 to mount the rack to the vehicle. The rack 10 may further rest on the wheel housing 28 for support.

While the best mode for carrying out the invention has been described in detail, those familiar with the art to which this invention relates will recognize various alternative designs and embodiments for practicing the invention as defined by the following claims. Rather, the words used in the specification are words of description rather than limitation, and it is understood that various changes may be made without departing from the spirit and the scope of the invention.

What is claimed is:

1. A vehicle rack for supporting at least one accessory having mounting pegs on a pickup truck bed having a plurality of stake pockets, the rack comprising:

a plurality of retaining arms, each of the plurality of retaining arms being received within a stake pocket of the pickup truck bed;

a panel integral with the plurality of retaining arms and extending along a side wall of the pickup truck, the panel defining a plurality of apertures for receiving the mounting pegs of the at least one accessory; and a locking member moveably affixed to the panel, the locking member having a plurality of obstructions which partially block the plurality of apertures when the locking member is slid into a locked position.

2. The vehicle rack defined in claim 1 wherein the panel and the retaining arms are made of Aluminum.

3. The vehicle rack defined in claim 1 wherein the locking member includes a handle.

4. The vehicle rack defined in claim 3 wherein the locking member includes a first elongate arm integral with the handle and the plurality of obstructions, the first elongate arm being received within a recess of a panel and being moveably affixed to the panel.

5. The vehicle rack defined in claim 4 wherein the locking member includes a second elongate arm integral with the first elongate arm, the plurality of obstructions, and the handle, the second elongate arm being moveably affixed to the panel.

6. A vehicle rack for receiving mounting pegs of at least one accessory on a pickup truck bed having a plurality of stake pockets, the rack comprising:

a plurality of retaining arms, each of the plurality of retaining arms being received within a stake pocket of the pickup truck bed;

a panel integral with the plurality of retaining arms and extending along a side wall of the bed of a pickup truck, the panel defining a plurality of apertures for receiving the mounting pegs of the at least one accessory; and a locking member moveably affixed to the panel, the locking member having a handle and a first elongate arm, the first elongate arm being adaptable to partially close the plurality of apertures when the locking member is slid into a locked position thereby locking the mounting pegs of the at least one accessory into the panel.

7. The vehicle rack defined in claim 6 wherein the locking member includes a second elongate arm integral with the first elongate arm and the handle, the second elongate arm being moveably affixed to the panel.

* * * * *